Figure 10:
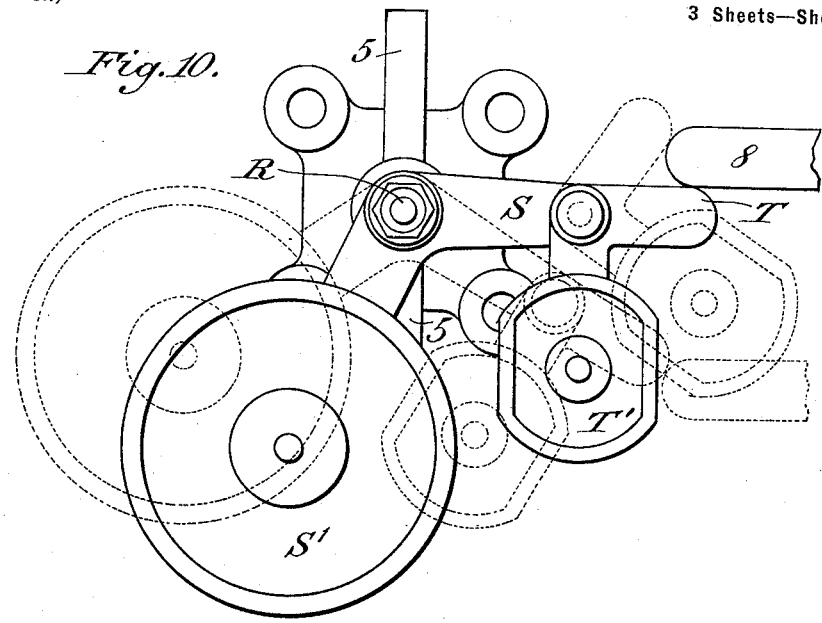

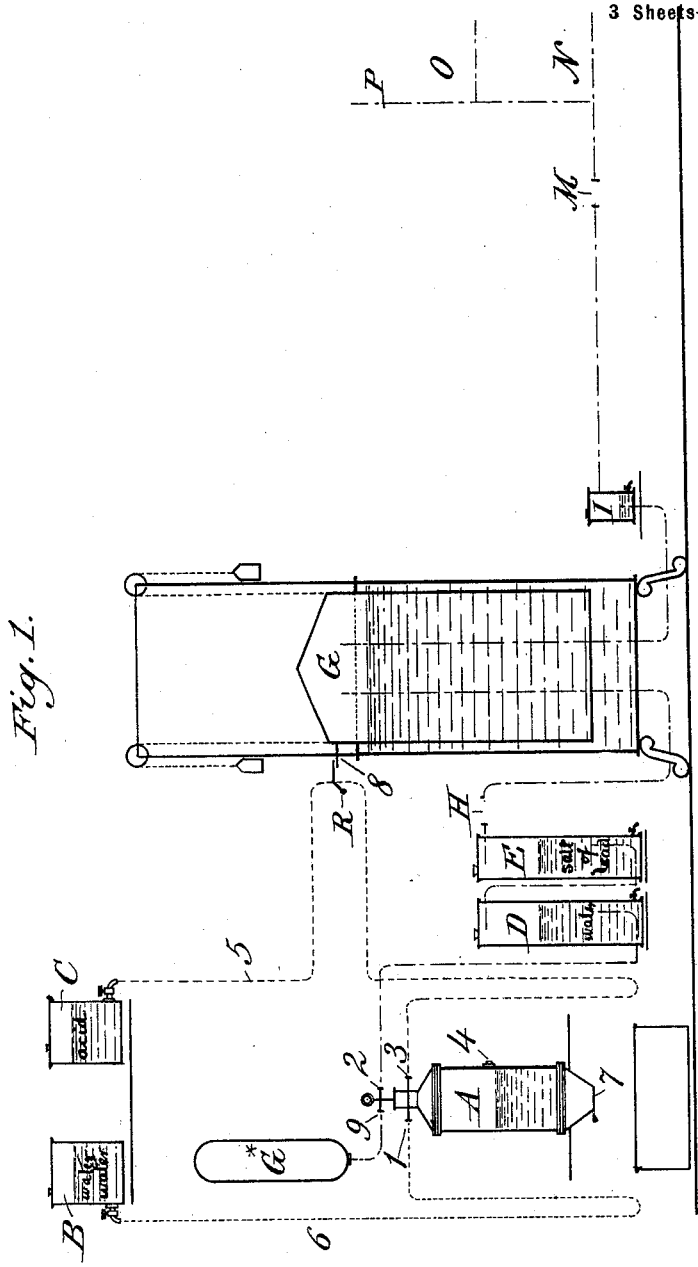

No. 610,867. Patented Sept. 13, 1898.
L. V. PRATIS & P. MARENGO.
PROCESS OF AND APPARATUS FOR MAKING HYDROGEN GAS AND OTHER PRODUCTS.
(Application filed July 15, 1897.)
(No Model.) 3 Sheets—Sheet 2.
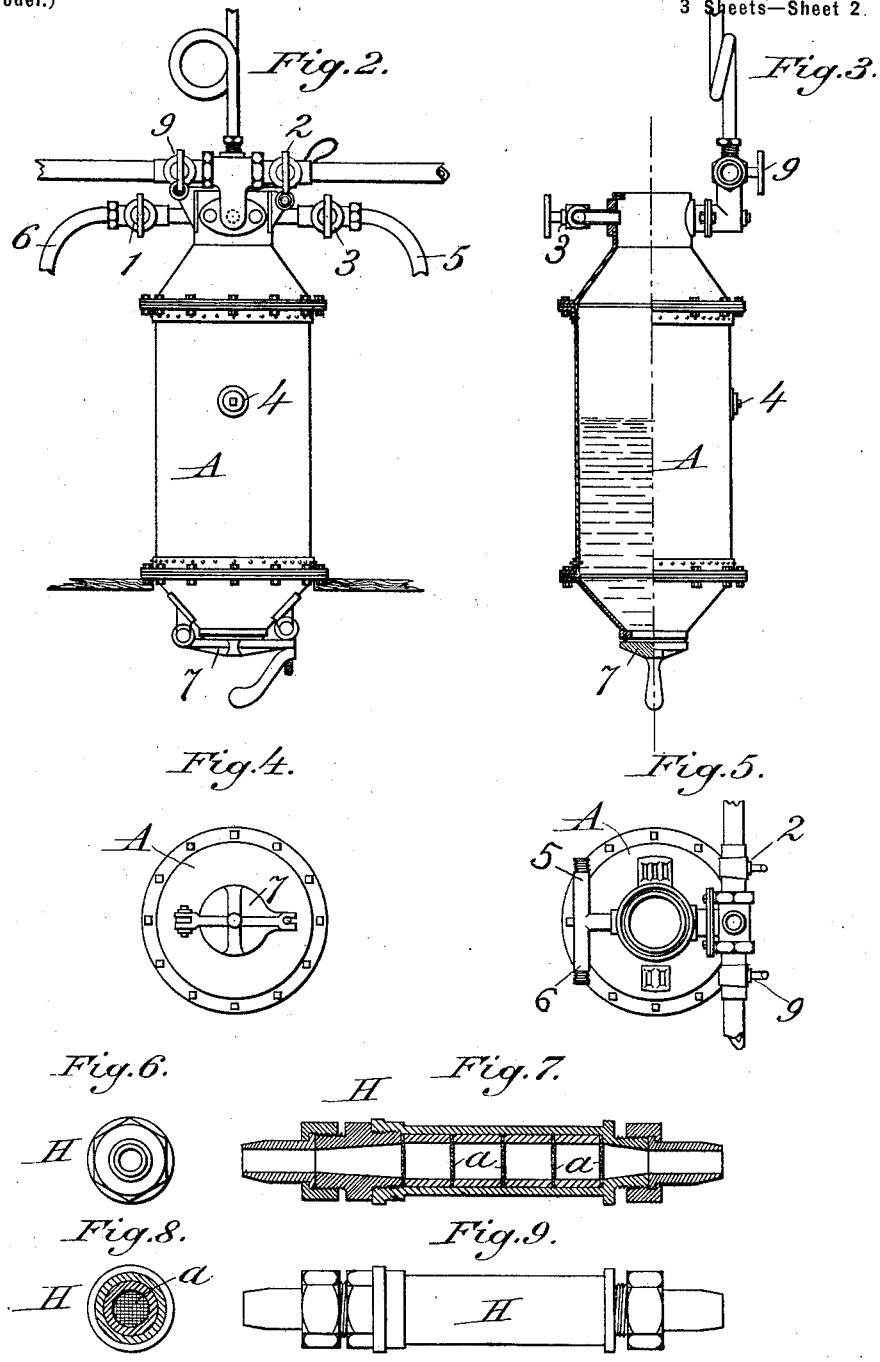

No. 610,867. Patented Sept. 13, 1898.
L. V. PRATIS & P. MARENGO.
PROCESS OF AND APPARATUS FOR MAKING HYDROGEN GAS AND OTHER PRODUCTS.
(Application filed July 15, 1897.)
(No Model.) 3 Sheets—Sheet 3.

UNITED STATES PATENT OFFICE.

LEOPOLDO VITTORIO PRATIS AND PIETRO MARENGO, OF TURIN, ITALY.

PROCESS OF AND APPARATUS FOR MAKING HYDROGEN GAS AND OTHER PRODUCTS.

SPECIFICATION forming part of Letters Patent No. 610,867, dated September 13, 1898.

Application filed July 15, 1897. Serial No. 644,701. (No model.) Patented in England July 22, 1896, No. 16,277, and June 29, 1897, No. 15,509; in Italy January 26, 1897, No. 43,205; in Belgium February 27, 1897, No. 126,377; in Luxemburg March 12, 1897, No. 2,783, and in Spain March 29, 1897, No. 20,497.

*To all whom it may concern:*

Be it known that we, LEOPOLDO VITTORIO PRATIS and PIETRO MARENGO, citizens of the Kingdom of Italy, residing at Turin, in the said Kingdom, have invented certain new and useful Improvements in Processes of and Apparatus for Making Hydrogen Gas and Other Products, (for which we have obtained patents in Italy, No. 43,205, dated January 26, 1897; in Belgium, No. 126,377, dated February 27, 1897; in Great Britain, No, 16,277, dated July 22, 1896, and No. 15,509, dated June 29, 1897; in Luxemburg, No. 2,783, dated March 12, 1897, and in Spain, No. 20,497, dated March 29, 1897;) and we do hereby declare the following to be a full, clear, and exact description of the invention.

This invention relates to the industrial production of hydrogen gas for any use to which such gas may be applied. We intend to employ it in place of coal-gas as an agent for raising refractory bodies or mantles to incandescence for illumination and as a heating agent for cooking and similar purposes and in admixture with air as an explosive agent for generating motive power in suitable engines, and to enable it to be thus employed we have made certain inventions in these arts or apparatus belonging thereto, for which we have made applications for patent of even date herewith; but while specially intended for such uses we do not intend to restrict ourselves to the use in these ways of the hydrogen gas produced in accordance with the present invention.

It has long been known that iron was capable of reacting with sulfuric acid with the formation of sulfate of iron and the elimination of hydrogen gas, and processes have been proposed for utilizing this reaction. Heretofore, however, such processes have been little practicable and have, so far as we are aware, been employed (when used at all) only occasionally and for limited times, more in the way of experiment than in an industrial manner. Among the objections attending such old processes, or some one or other of them, may be mentioned the slow generation of the hydrogen, the obtainment of the sulfate of iron in very dilute solution from which the sulfate of iron cannot economically be obtained, and the crystalization of the ferrous sulfate among the particles of iron in the generator, so as thereby to form a hard mass which can with difficulty be removed. By the present invention the reaction of iron on sulfuric acid is utilized, while at the same time the difficulties above mentioned are avoided. In accordance with said invention the iron in small particles is placed in a suitable generator and the sulfuric acid is let in upon the iron in such proportion and in such dilution as to form (as the result of the reaction) a pasty mass of iron, ferrous sulfate, and water, it being discovered by us that in these proportions there is a rapid generation of hydrogen with a practically complete saturation of the sulfuric acid and with the formation of a residue which can be emptied by dumping (say by simply dropping the bottom of the generator) and which can be economically utilized in the production of by-products—as, for example, green vitriol (crystalized ferrous sulfate) and Nordhausen sulfuric acid. The proper proportion may be otherwise stated as about equal weights of subdivided iron, water, and sulfuric acid of 50° Baumé, the last being most advantageously somewhat in excess, as 5.8 parts, by weight, 50° Baumé sulfuric acid to five parts, by weight, of water and five parts, by weight, of iron.

The full supply of acid might be introduced all at the start; but where the gas is to be conducted through pipes to the place of utilization it is advantageous to admit the acid gradually to the iron, the water being first mingled with the iron or with the acid or being admitted to the iron along with the acid; and it is also advantageous to control the admission of the acid by a cock or valve which is automatically controlled by the bell of the gasometer which receives the gas from the generator.

Where the gas is to be used in places which have no pipe connection with the gas-works—as in vehicles, for example, or it may be in houses having no pipe connection with the gas-works—it is considered most advantageous to admit the whole proportion of acid at the start, so as to get the compressive effect of the very energetic chemical action which results. The gas may be stored in suitable receptacles, as in bottles composed, say, of strong metal tubes, under the strong pressure effected by the chemical action. The gas might of course also be obtained under pressure of chemical reaction by a gradual admission of the acid; but by admitting the acid and water to the iron at the start in the predetermined proportions it is not required to introduce the acid against the high pressure which obtains in the generator during the generation under pressure of the gas.

The invention also comprises such other or further parts, improvements, and combinations as are hereinafter set forth.

Figure 11:
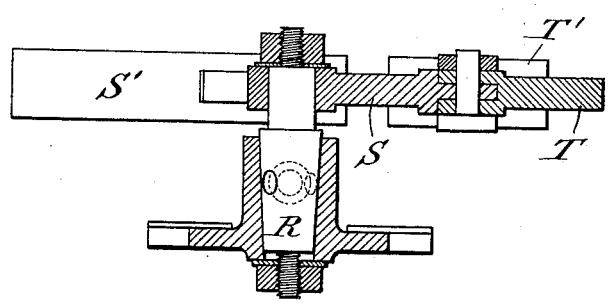

In the accompanying drawings, which form part of this specification, Figure 1 is a diagram of apparatus in accordance with the invention. Figs. 2, 3, 4, and 5 are views of the generator in front elevation, in side elevation, partly in section, in bottom view, and in plan, respectively. Figs. 6, 7, 8, and 9 are views of a gas-check and safety device in end view, in longitudinal section, in cross-section, and in side elevation, respectively; and Figs. 10 and 11 are views in elevation and horizontal section, respectively, of a tap or valve which may with advantage be used in some cases for regulating the admission of acid to the generator.

The generator A is a vessel of suitable strength, of wrought or cast iron or of copper lined with lead, provided with pipe connections, as explained below, and with means for dumping the residue after running off the hydrogen for a charge, such means, as shown, consisting of a bottom 7, which can be dropped to empty the generator of its contents.

The bottom being in place and the top uncovered, the iron is introduced in a subdivided condition, such as iron filings or borings or the like. Any suitable form of iron (wrought-iron, cast-iron, or other form) which will readily react with sulfuric acid will answer. The vessel should be of such size that the full amounts of iron, water, and sulfuric acid for a run will fill it about half full.

The water (to an amount equal in weight to the iron) may be let into the generator from the elevated vessel B through the pipe 6 by opening a tap or cock at 1, and the acid of 50° Baumé may be let in from the elevated vessel C through the pipe 5 by opening a tap or cock at 3. The pipes 5 and 6 should be of lead and (especially if the liquids are to be introduced gradually) should be provided with traps of, say, one to two meters depth, according to the back pressure under which the gas is generated. The vessels B and C are shown provided with gages to indicate the liters of liquid therein. For each five kilograms of iron in the generator A five liters of water and 3.9 liters of acid of 50° Baumé (so as to give five kilograms of water and 5.8 kilograms of acid of 50° Baumé to each five kilograms of iron) may be let into the said generator either all at the start or gradually, as may be thought expedient. These proportions will give about a cubic meter of hydrogen under atmospheric pressure of seven hundred and sixty millimeters of mercury.

Before allowing the hydrogen to pass to the hydrogen-receiver the plug 4 should be opened until the air has escaped. Then the plug being closed and the tap at 2 being opened the gas passes through the washing vessels D and E and the gas-check and safety device H to the gasometer G. The vessels D and E may be made of any suitable materials (as iron or copper lined with lead) and may contain any suitable purifying agents, as water in the vessel D and a solution of a salt of lead in the vessel E. This latter removes any sulfureted, arseniureted, or phosphoreted hydrogen which the gas may contain.

The device H (see Figs. 6 to 9) consists of a tubular case with a series of perforated diaphragms $a$ therein, which may be made of closely-woven wire-gauze placed at short distances apart. These serve to check the flow of the gas, so that if the generation tends to become excessive the pressure rises in the generator A and (if the taps of pipes 5 and 6 are open) forces the acid out, so that the generation of hydrogen is temporarily interrupted. The perforated diaphragms also serve to prevent flame (in case of accident) from passing back to the generator.

From the gasometer G the gas passes through an insulating water-valve I, then it traverses another device M, similar to the one at H, and, lastly, passes off by the branch pipes N O P to the places of utilization.

The water-valve I is provided as an additional means of precaution; but it may be dispensed with, if preferred.

If the production of hydrogen gas is to take place automatically, there may be substituted for the hand-operated tap or valve 3 in pipe 5 or be employed in addition to such tap 3 a cock or valve, as at R, so connected with the gasometer G as to be operated thereby. When the bell of the gasometer G rises, the finger S thereon is withdrawn, so that the key of cock R may close and the supply of acid may be temporarily interrupted. When the bell of gasometer G falls, finger S opens the cock R automatically and a further supply of acid flows into the generator.

Any suitable cock or valve could be used at R and any suitable connection could be employed between it and the gasometer-bell; but a special improvement consists in a form which closes when the gasometer-bell descends below a predetermined limit. The object of this is that when the supply of acid in vessel C (which should be in amount proportionate to the charge of iron in the generator) is exhausted the pipe 5 shall be automatically closed. Referring to Figs. 10 and 11, the key of cock R (which is preferably made of an alloy of four parts, by weight, of lead and one part, by weight, of antimony) is connected with a bent lever S, provided with a weight S', which tends to maintain said key in its closed position. On the other arm of the lever S is pivoted a finger T, which can be lifted independently of the arm of lever S, but which when depressed carries the lever S with it. This finger T has a depending arm provided with a weight T' for returning it whenever it is lifted.

At the start the cock R is opened by hand until sufficient acid has entered the generator A to produce so much gas as to lift the bell of gasometer G, and thereby bring the finger 8 above the finger T. Then through the consumption the gasometer-bell falls and the finger 8 depresses the finger T and turns the key of cock R, so as to admit more acid to the generator, whereupon the bell rises again and the weight S' closes the cock R. This automatic opening and closing of the valve R is repeated, so as to supply the acid gradually in proportion to the consumption. When the supply of acid in the vessel C is exhausted, the bell no longer rises after opening the cock R, but continues to descend. The finger 8, after depressing the lever S to its full extent, slips off of the finger T and the weight S' closes the valve. Should the bell rise in any case after the finger 8 has passed below the finger T, this latter is free to be lifted thereby; but as soon as the finger 8 has passed upward the weight T' brings the finger T back into the path of the said finger 8.

When it is desired to obtain hydrogen gas in receivers under strong pressure—say from ten to fifty atmospheres—a suitable receptacle may be connected with the generator with or without the interposition of purifying vessels, as may be necessary or expedient. A receptacle is indicated at G*, a tap being provided at 9. When the receptacle G* would be filling under pressure, the tap 2 would be closed, and the requisite amounts of water and acid (as well as of iron) should have been introduced in the generator A before a high pressure has accumulated therein, although the liquids could be forced in during the generation against the pressure inside. Knowing the capacity of the receiver and the pressure desired therein it is easy to calculate the amounts of iron, water, and acid to be used from the data given hereinabove. At the end of the operation the tap 9 is closed and the compressed gas in the upper part of the generator A is let into the gasometer G by opening the tap 2.

Whether the hydrogen has been generated under atmospheric or superatmospheric pressure, the elimination of the hydrogen takes place rapidly and with a practically complete saturation of the sulfuric acid, and there remains in the generator a pasty mass of iron, ferrous sulfate, and water, which will fall out of the generator without leaving incrustation therein and which is in such condition that it can easily be taken away and utilized for by-products or for revivifications. With the generator shown the bottom 7 is dropped and the pasty residue deposits itself in the receiver F below. Thereupon the said generator is ready to receive a new charge of subdivided iron, water, and acid of 50° Baumé.

To utilize the residue, green vitriol and Nordhausen acid (either or both) may be made therefrom. To make green vitriol, the residue (or any desired portion thereof) may be mixed with enough water to separate the soluble ferrous sulfate from the insoluble residue, and the green vitriol may be crystallized out of the so-obtained solution, or the residue may be treated with a new supply of sulfuric acid to convert the iron into ferrous sulfate after the manner customary in making green vitriol from iron and sulfuric acid. To make Nordhausen acid, the residue is dried and roasted. The iron in the roasted residue may be separated from the iron oxid by sifting. This iron or the iron which may remain after washing off the ferrous sulfate may be used again in the generator A as a part of a fresh charge.

While we have specified the use of sulfuric acid of 50° Baumé, we do not restrict ourselves to it, since acid of higher or lower gravity may be used (if the amount of water be increased or diminished proportionately) without altering the relative proportions of sulfuric acid, ($H_2SO_4$,) water, ($H_2O$,) and iron (Fe) in the generator.

We believe that we are the first to utilize a pasty mass of iron, ferrous sulfate, and water for the recovery of products formed by the reaction of sulfuric acid of suitable dilution on iron, and more especially of such products as green vitriol and Nordhausen acid, either or both, for which purpose or purposes such paste has advantages, and such utilization we believe to be new with us, even if the hydrogen gas generated by the reaction should not itself be utilized; but in conjunction with the recovery and utilization of the hydrogen it constitutes a further new combination or improvement.

We claim as our invention or discovery—

1. The process of producing hydrogen gas, by bringing in contact with iron such proportion of sulfuric acid and water as to form in the generator at the end of the operation a pasty mass of iron, ferrous sulfate and water, that is to say the proportion of about equal parts by weight of iron, sulfuric acid of 50° Baumé and water, substantially as described.

2. The process of producing from iron and sulfuric acid, hydrogen gas and other products, more especially green vitriol and Nordhausen acid, either or both, by bringing in contact with iron such proportion of sulfuric acid and water as to form in the generator at the end of the operation a pasty mass of iron, ferrous sulfate and water, that is to say the proportion of about equal parts by weight of iron, sulfuric acid of 50° Baumé and water, and treating said pasty mass for the recovery of the other products, to wit by the addition of water and crystallization for the recovery of green vitriol, and by roasting for the recovery of Nordhausen acid, substantially as described.

3. The process of producing hydrogen gas, by bringing in contact with iron in a generator such proportions of sulfuric acid and water as to form in the generator at the end of the operation a pasty mass of iron, ferrous sulfate and water, and discharging such paste by gravitation so as to leave the generator empty for a new charge, the said proportions being about equal parts by weight of iron, sulfuric acid of 50° Baumé and water, substantially as described.

4. The combination with a gasometer provided with a cock-operating device, of a cock-key, a weighted lever connected with said key for shifting the same, and a hinged finger in the path of said cock-operating device so mounted on said lever as to carry the latter with it in one direction and to be movable independently of the same in the opposite direction, the movement of said gasometer back and forth within certain limits shifting the said cock-key positively in one direction and allowing the weighted lever to return it in the other, a sufficient movement of said lever being permitted for the said device to pass beyond said finger in the first-mentioned direction and thereby release the said lever when the movement of said gasometer is continued beyond the said limits, and the independent movement of said finger allowing the said device in such case to return past said finger in the opposite direction, substantially as described.

5. The combination with a hydrogen-generator supplied with oxidizable metal, an acid-supply pipe, and a gasometer connected by a pipe with said generator and provided with a cock-operating device, of a cock-key in said acid-supply pipe, a weighted lever connected with said key for shifting the same, and a hinged finger in the path of said cock-operating device so mounted on said lever as to carry the latter with it in one direction and to be movable independently of the same in the opposite direction, the movement of said gasometer back and forth within certain limits shifting the said cock-key positively in one direction and allowing the weighted lever to return it in the other, a sufficient movement of said lever being permitted for the said device to pass beyond said finger in the first-mentioned direction and thereby release the said lever when the movement of said gasometer is continued beyond the said limits, and the independent movement of said finger allowing the said device in such case to return past said finger in the opposite direction, substantially as described.

6. The combination of a cock-key, a weighted lever connected with said key for shifting the same, and a hinged finger so mounted on said lever as to carry the latter with it in one direction and to be movable independently of the same in the opposite direction, substantially as described.

7. The combination with a reciprocatory cock-operating device, of a cock-key, a weighted lever connected with said key for shifting the same, and a hinged finger in the path of said cock-operating device so mounted on said lever as to carry the latter with it in one direction and to be movable independently of the same in the opposite direction, the movement of said device back and forth within certain limits shifting the said cock-key positively in one direction and allowing the weighted lever to return it in the other, a sufficient movement of said lever being permitted for the said device to pass beyond said finger in the first-mentioned direction and thereby release the said lever when the movement of said device is continued beyond the said limits, and the independent movement of said finger allowing the said device in such case to return past said finger in the opposite direction, substantially as described.

In testimony whereof we affix our signatures in presence of two witnesses.

LEOPOLDO VITTORIO PRATIS.
PIETRO MARENGO.

Witnesses:
MARIO CAPUCCIO,
HUGO PIZZOTTI.